(12) United States Patent
Onishi et al.

(10) Patent No.: US 12,547,974 B2
(45) Date of Patent: Feb. 10, 2026

(54) TERMINAL DEVICE AND INVENTORY MANAGEMENT SYSTEM

(71) Applicant: DAIO PAPER CORPORATION, Shikokuchuo (JP)

(72) Inventors: Masato Onishi, Shikokuchuo (JP); Masahide Takanashi, Tokyo (JP); Taro Ikawa, Shikokuchuo (JP); Hiroyuki Fukase, Shikokuchuo (JP)

(73) Assignee: DAIO PAPER CORPORATION, Shikokuchuo (JP)

( * ) Notice: Subject to any disclaimer, the term of this patent is extended or adjusted under 35 U.S.C. 154(b) by 279 days.

(21) Appl. No.: 17/642,390

(22) PCT Filed: Sep. 2, 2020

(86) PCT No.: PCT/JP2020/033340
§ 371 (c)(1),
(2) Date: Mar. 11, 2022

(87) PCT Pub. No.: WO2021/065316
PCT Pub. Date: Apr. 8, 2021

(65) Prior Publication Data
US 2022/0343266 A1 Oct. 27, 2022

(30) Foreign Application Priority Data

Sep. 30, 2019 (JP) ................. 2019-180777

(51) Int. Cl.
*G06Q 10/087* (2023.01)
*G06K 7/10* (2006.01)
(52) U.S. Cl.
CPC ....... *G06Q 10/087* (2013.01); *G06K 7/10366* (2013.01)

(58) Field of Classification Search
CPC ................. G06Q 10/087; G06K 7/10366
See application file for complete search history.

(56) References Cited

U.S. PATENT DOCUMENTS 6,715,003 B1 * 3/2004 Safai .................. H04N 1/00413
348/211.3
7,689,316 B1 * 3/2010 Frederick .................. G07F 7/06
700/242

(Continued)

FOREIGN PATENT DOCUMENTS

JP 2016-162178 A 9/2016
JP 2017-168004 A 9/2017

(Continued)

OTHER PUBLICATIONS

Alwadi, Ali, et al. "Smart solutions for RFID based inventory management systems: A survey." Scalable Computing: Practice and Experience 18.4 (2017): 347-360. (Year: 2017).*

(Continued)

*Primary Examiner* — Nathan A Mitchell
(74) *Attorney, Agent, or Firm* — Maier & Maier, PLLC

(57) ABSTRACT

A disclosed terminal device includes: an article display unit displaying article information relevant to articles in a list on a display, on the basis of identification information of the articles that is read out from RFID tags provided in storage bodies storing the articles; and a quantity setting screen display unit displaying a screen for setting an inventory quantity of the article selected from the article information displayed on the display, on the display.

11 Claims, 9 Drawing Sheets

(56) References Cited

U.S. PATENT DOCUMENTS

| | | | | | |
|---|---|---|---|---|---|
| 2002/0185532 | A1* | 12/2002 | Berquist | ............. | G07G 1/0045 |
| | | | | | 235/385 |
| 2003/0224337 | A1* | 12/2003 | Shum | ..................... | A63B 24/00 |
| | | | | | 434/247 |
| 2006/0076397 | A1* | 4/2006 | Langos | ................ | G06Q 10/087 |
| | | | | | 235/375 |
| 2008/0186167 | A1* | 8/2008 | Ramachandra | .... | G06Q 10/0875 |
| | | | | | 340/572.1 |
| 2010/0123562 | A1* | 5/2010 | Hiramatu | ............. | G06Q 10/087 |
| | | | | | 709/219 |
| 2011/0246219 | A1* | 10/2011 | Smith | .................. | G06Q 10/087 |
| | | | | | 705/28 |
| 2012/0038515 | A1* | 2/2012 | Truitt | .................. | H01Q 1/2208 |
| | | | | | 343/702 |
| 2014/0009291 | A1 | 1/2014 | Requist et al. | | |
| 2018/0005175 | A1* | 1/2018 | Philippe | ................ | B65F 1/1463 |
| 2019/0180150 | A1* | 6/2019 | Taylor | .................. | G06V 30/224 |
| 2019/0282000 | A1* | 9/2019 | Swafford | ................ | A47F 10/02 |
| 2019/0355039 | A1* | 11/2019 | Tzeng | .................. | G06Q 10/087 |
| 2020/0311655 | A1* | 10/2020 | Shen | .................. | G08B 13/2417 |
| 2022/0027841 | A1* | 1/2022 | Mitchell | .......... | G06K 19/07749 |

FOREIGN PATENT DOCUMENTS

| | | | |
|---|---|---|---|
| JP | 6302857 | B2 * | 3/2018 |
| JP | 2019-28921 | A | 2/2019 |
| JP | 6486786 | B2 | 3/2019 |

OTHER PUBLICATIONS

Saygin, C. "Adaptive inventory management using RFID data." The International Journal of Advanced Manufacturing Technology 32 (2007): 1045-1051. (Year: 2007).*

International Search Report issued on Nov. 10, 2020 in corresponding International application No. PCT/JP2020/033340; 5 pages.

"Case: Efficiency of Actual Article Checking Operation in Inventory Clearance with RFID (IC Tag)" [Searched on Sep. 19, 2019] Internet <URL: https://www.fujibuturyu.co.jp/solution/case15.html>.

* cited by examiner

US 12,547,974 B2

TERMINAL DEVICE AND INVENTORY MANAGEMENT SYSTEM

FIELD

The present disclosure relates to a terminal device and an inventory management system.

BACKGROUND

In Non-Patent Document 1, a technology of reading information of an article that is an inventory management target and is provided on a shelf with a radio-frequency identification (RFID) reader, without moving the article from the shelf, is disclosed.

NON-PATENT DOCUMENT

Non-Patent Document 1: "Case: Efficiency of Actual Article Checking Operation in Inventory Clearance with RFID (IC Tag)" [Searched on Sep. 19, 2019] Internet <URL: https://www.fujibuturyu.co.jp/solution/case15.html>

SUMMARY

However, in the technology disclosed in Non-Patent Document 1, in a case where an RFID tag is provided in a storage body storing a plurality of articles, the information of the article that is embedded in the RFID tag is displayed in a list on a screen of the RFID reader, but an inventory quantity of the displayed article is not capable of being adjusted on the screen. Accordingly, there is room for improvement in inventory management.

The disclosure has been made in consideration of such circumstances described above, and an object thereof is to obtain a terminal device in which accurate article inventory management can be attained.

In order to attain the object described above, a terminal device of the disclosure includes: an article display unit displaying a list of article information that is information in which types of articles stored in one or a plurality of storage bodies are associated with the number of articles on a display, on the basis of identification information of the articles that is read out from RFID tags provided in the one or the plurality of storage bodies storing the articles; and a quantity setting screen display unit displaying a screen for setting an inventory quantity of the article selected from a list of the articles displayed on the display, on the display.

According to the disclosure, an effect is obtained in which accurate article inventory management can be attained.

DETAILED DESCRIPTION

Figure 1:
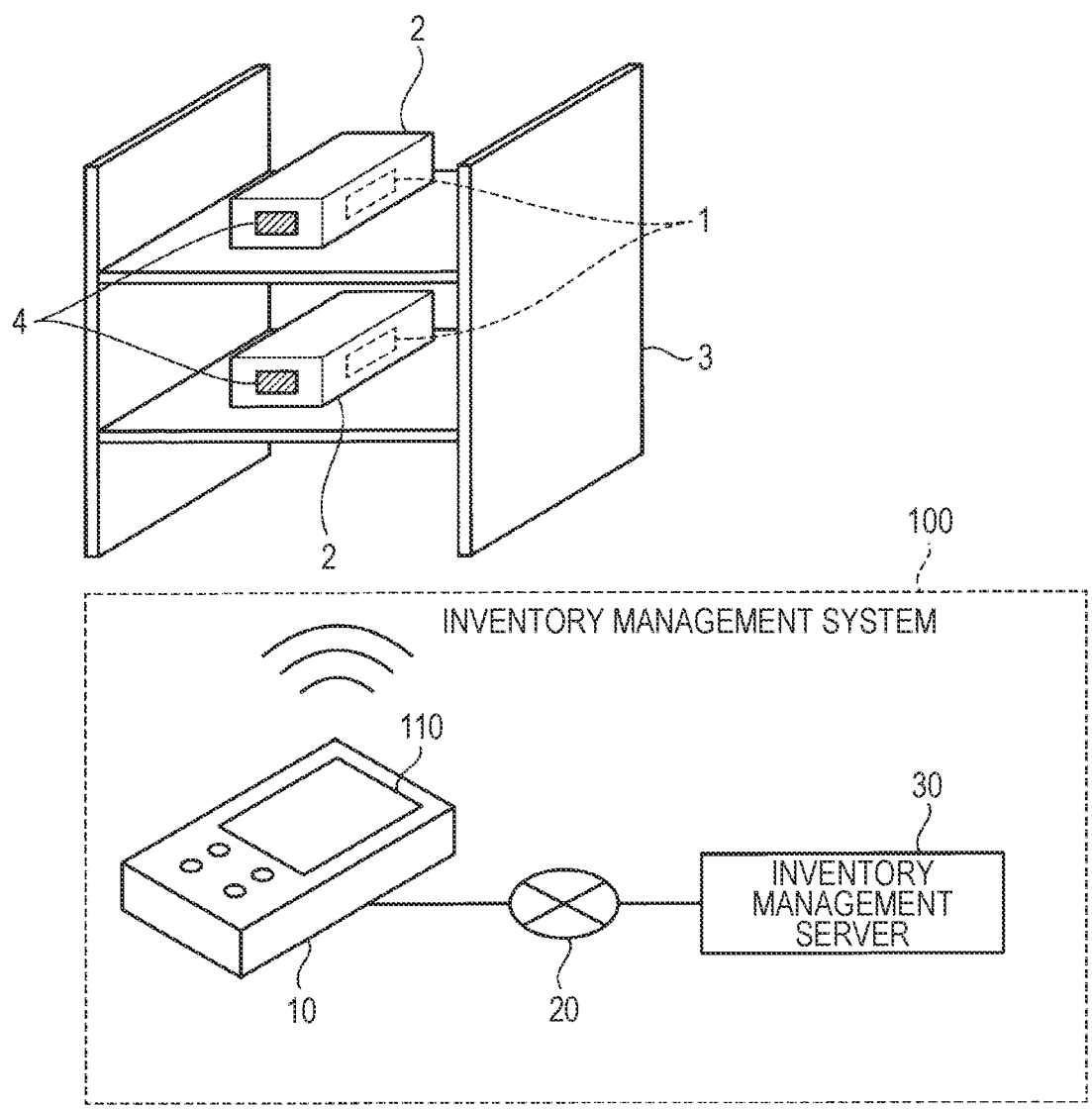
FIG. 1 is a diagram illustrating a configuration example of an inventory management system according to an embodiment of the disclosure.

An embodiment of the disclosure will be described in detail, with reference to the drawings. In the following description, the same reference numerals will be applied to the common parts in each of the drawings, and the description thereof may be omitted. In addition, in order to facilitate understanding, the scale of each member in each of the drawings may be different from the actual scale.

FIG. 1 is a diagram illustrating a configuration example of an inventory management system according to an embodiment of the disclosure. In FIG. 1, a shelf 3 on which a storage body 2 storing an article 1 that is an inventory management target is provided, and an inventory management system 100 managing the inventory of the article 1 are illustrated.

The article 1, for example, is a thrust washer, a slide plate, a nylon washer, a screw, a screw nut, and the like. Note that, the article 1 is not limited insofar as the article 1 can be stored in the storage body 2. The storage body 2, for example, is a cardboard box, a plastic container, and the like. Note that, the storage body 2 is not limited insofar as the storage body 2 is capable of storing the article 1 described above and is capable of being attached with an RFID tag 4.

In FIG. 1, the shelf 3 is exemplified on which two storage bodies 2 are provided. In the storage body 2 that is provided on the lower stand of the shelf 3, for example, a plurality of thrust washers are stored as the article 1. In the storage body 2 that is provided on the upper stand of the shelf 3, for example, a plurality of nylon washers are stored as the article 1.

In each of a plurality of storage bodies 2, the RFID tag 4 for identifying the article 1 is provided. RFID is a technology of wirelessly reading information in a non-contact manner. The RFID tag 4 is a tag recording identification information of the article 1 that is stored in the storage body 2. The RFID tag 4, for example, includes an IC chip in which the identification information of the article 1 is recorded, a looped conductor, and an antenna. The IC chip, the looped conductor, and the antenna, for example, are arranged to be interposed between a plurality of synthetic resin films to be stacked. The IC chip has an internal capacity, and a matching circuit is configured by the inductance of the antenna and the internal capacity of the IC chip. The looped conductor is electrically connected to the IC chip and the antenna.

The inventory management system 100 includes an RFID reader 10 reading the identification information that is recorded in the RFID tag 4, and an inventory management server 30 that is a server managing the inventory of the article 1.

The RFID reader 10, for example, is connected to the inventory management server 30 through a communication network 20. The communication network 20 is a communication line based on a communication standard, such as Ethernet (Registered Trademark), RS485, Wi-Fi (Registered Trademark), and Bluetooth (Registered Trademark). The communication network 20 includes an internet network, a mobile telephone network, and the like. The mobile telephone network is wireless communication line such as third generation (3G), fourth generation (4G), long term evolution (LTE), or fifth generation (5G).

For example, in a case where the identification information of the RFID tag 4 is read by the RFID reader 10, a current flows through the looped conductor of the RFID tag 4 by a resonance action when an electrical wave in an ultra high frequency (UHF) band that is emitted from the RFID reader 10, for example, an electrical wave in the vicinity of 920 [MHz] is received by the antenna of the RFID tag 4. Accordingly, an electromotive force for operating the IC chip of the RFID tag 4 is generated, and thus, the IC chip is operated. Accordingly, the identification information recorded in the IC chip is encoded, and the encoded data is wirelessly transmitted to the RFID reader 10, by using the electrical wave in the vicinity of 920 [MHz] as a carrier wave. The RFID reader 10 receiving such a signal decodes the signal and transmits the signal to the inventory management server 30.

Note that, the RFID tag 4 can be applied not only to the electrical wave in the UHF band but also to an electrical wave in a very high frequency (VHF) band, a super high frequency (SHF) band, or the like. In a case where a usable frequency of the RFID tag 4 is a frequency in the UHF band, the frequency in the UHF band is higher than a frequency in the VHF band, and thus, a wavelength is shortened, which is advantageous to a reduction in the size of the antenna. Accordingly, the RFID tag 4 has a shape preferable for the electrical wave in the UHF band, and thus, the size of the IC chip provided in the RFID tag 4 can be reduced, and an inexpensive wireless tag with a small memory capacity can be obtained. In addition, the RFID tag 4 can be applied to both of an electromagnetic guidance type wireless tag and an electrical wave type wireless tag. In particular, in a case where the RFID tag 4 is applied to the electrical wave type wireless tag, a constant wireless communication distance can be ensured between the RFID tag 4 and the RFID reader 10.

The inventory management server 30, for example, is a cloud server managing the inventory of the article 1 stored in the storage body 2 by using the identification information that is read by the RFID reader 10 and information relevant to the article 1 that is set in advance. The inventory management server 30, for example, activates a virtual machine by installing virtual machine software (a virtualization application), which is stored in a memory, by a central processing unit (CPU). The virtual machine software installs an individual operating system (OS) by emulating individual hardware on a host OS. Accordingly, a plurality of virtual machines can be executed independently from each other on a single system. In such a cloud environment, software collecting data from the RFID reader 10 (collection software), software analyzing the data (analysis software), and the like are constructed. By using such a virtualization technology, efficient utilization of resources, the suppression of the costs of the initial investment of hardware, power saving, space saving, and the like can be attained.

Next, a configuration example of the inventory management server 30 will be described with reference to FIG. 2 and FIG. 3.

Figure 2:
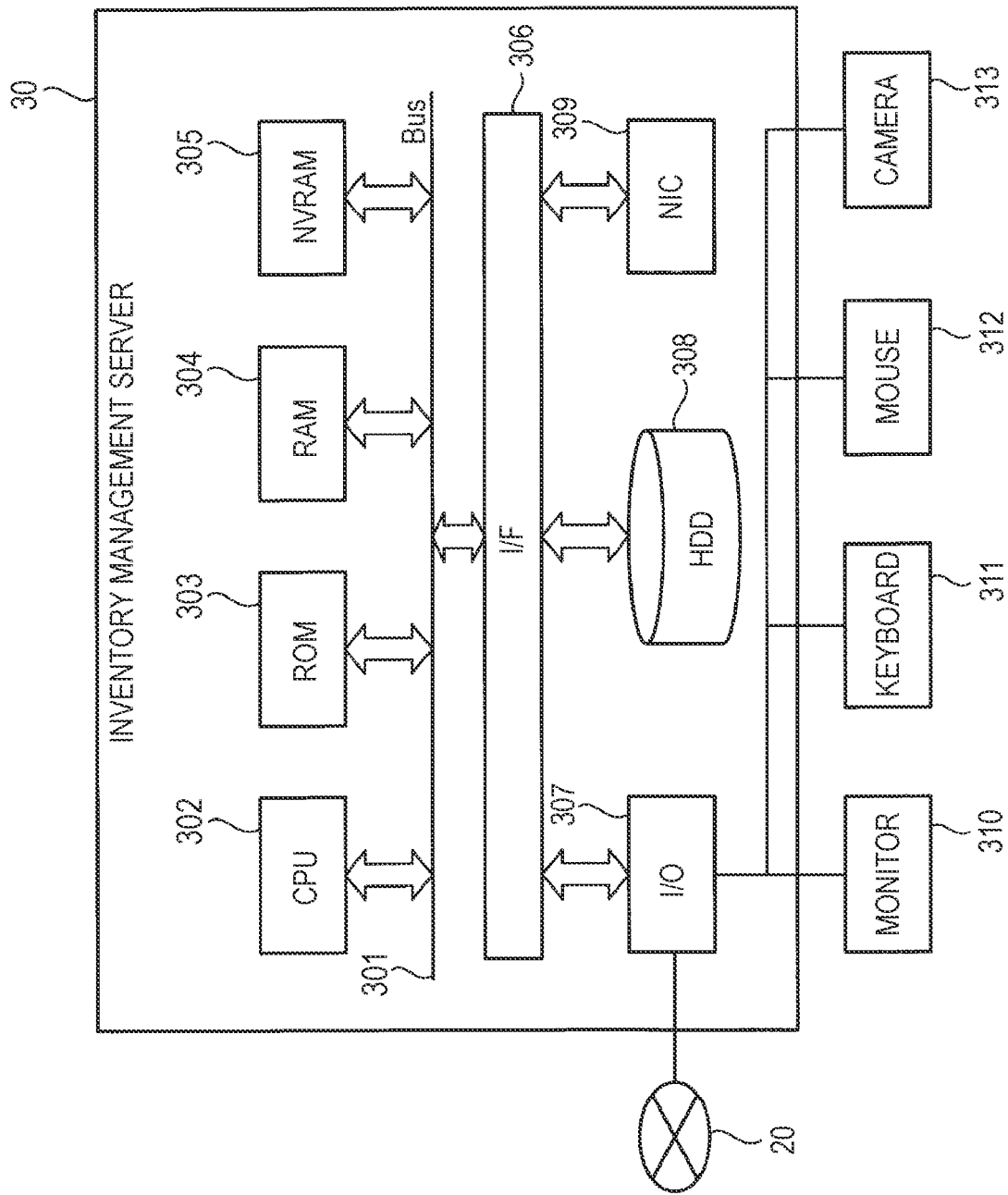
FIG. 2 is a diagram illustrating a hardware configuration example of an inventory management server.

FIG. 2 is a diagram illustrating a hardware configuration example of the inventory management server. The inventory management server 30 includes a CPU 302, a read only memory (ROM) 303, a random access memory (RAM) 304, and a non-volatile RAM (NVRAM) 305, which are connected to a system bus 301. In addition, the inventory management server 30 includes an interface (I/F) 306, and an input-output interface (I/O) 307, a hard disk drive (HDD) 308, and a network interface controller (NIC) 309, which are connected to the I/F 306.

The CPU 302 reads out a program, data, and the like, stored in a storage unit such as the ROM 303, onto the RAM 304, and executes processing, and thus, attains the function of the inventory management server 30.

For example, a monitor 310, a keyboard 311, a mouse 312, a camera 313, and the like are connected to the I/O 307. The keyboard 311 and the mouse 312 are an example of a user interface.

Figure 3:
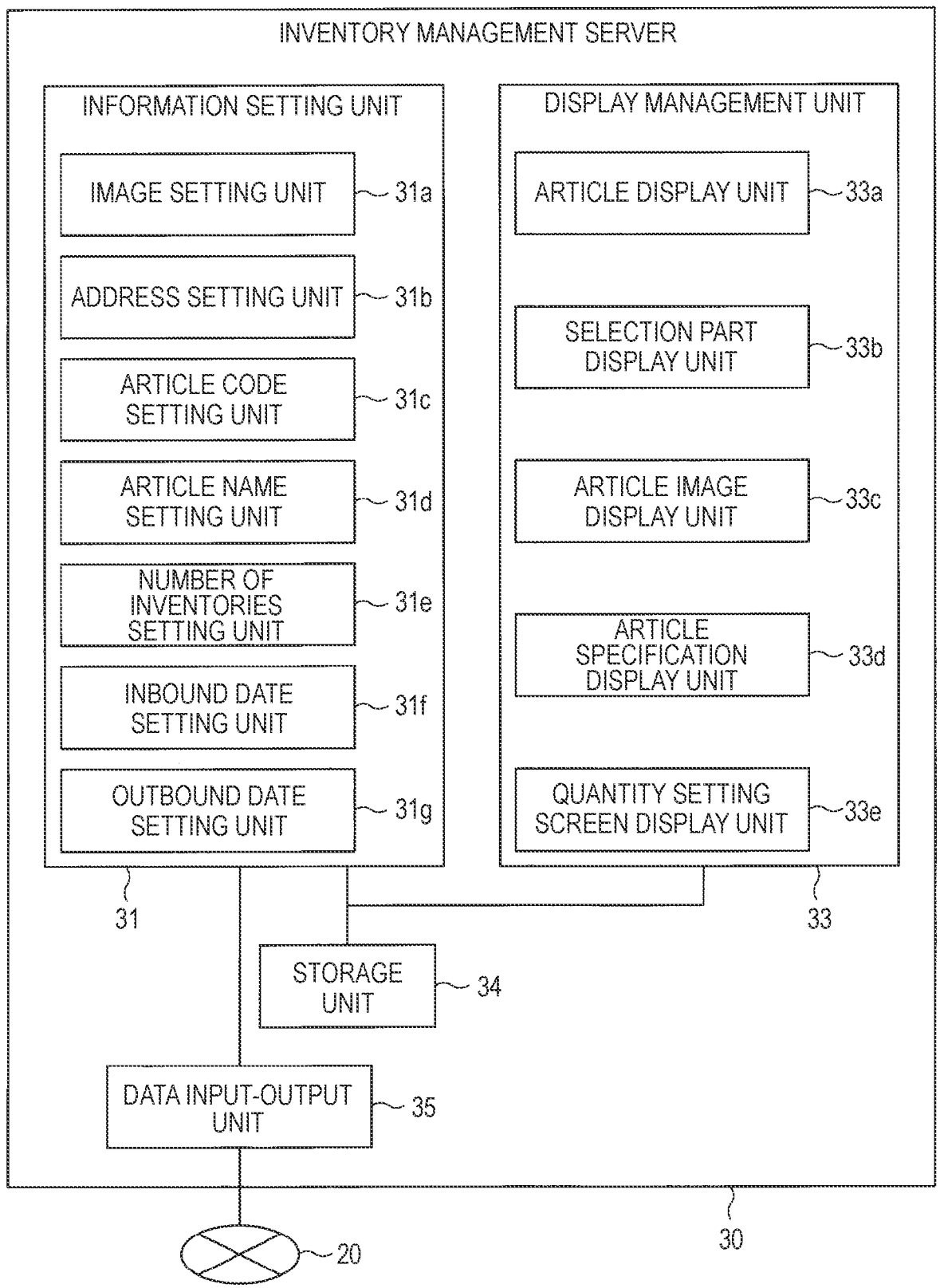
FIG. 3 is a diagram for describing a function of the inventory management server.

FIG. 3 is a diagram for describing the function of the inventory management server. The inventory management server includes an information setting unit 31, a display management unit 33, a storage unit 34, and a data input-output unit 35.

The information setting unit 31 is a function of setting various information items relevant to the article 1 that is the inventory management target as inventory management article information in the storage unit 34. The inventory management article information, for example, is information in which an image of the article 1, an article code for identifying the article 1 and the like are associated with each of the articles. The storage unit 34, for example, is a memory such as the RAM 304 and the ROM 303 illustrated in FIG. 2.

The information setting unit 31 includes an image setting unit 31a, an address setting unit 31b, an article code setting unit 31c, an article name setting unit 31d, a number of inventories setting unit 31e, an inbound date setting unit 31f, and an outbound date setting unit 31g.

The image setting unit 31a is a function of setting the image of the article 1. For example, in a case where image data of the thrust washer that is photographed in advance by the camera 313 is input, the image setting unit 31a sets the image data in the storage unit 34 by associating the image data with identification information for identifying the thrust washer. It is desirable that the entire appearance of the article 1 is clearly represented in the image of the article 1 such that a user is capable of easily identifying the shape, the type, or the like of the article 1. The image data is not limited to the data photographed by the camera 313, and for example, may be data provided from a manufacturer of the article 1. The identification information, for example, may be information that is input by the keyboard 311 or the like, or may be information that is generated by the image setting unit 31a identifying the article 1 from the image data.

The address setting unit 31b is a function of setting a shelf number that is information indicating the location of the article 1. For example, in a case where the shelf 3 is provided in a specific compartment in a warehouse, the shelf number includes a compartment number indicating the compartment, an in-compartment shelf position number indicating each position of a plurality of shelves 3 arranged in the compartment, an article position number indicating an arrangement position of the storage body 2 in each of the shelves 3 (for example, the upper stand, the middle stand, the lower stand, and the like), and the like. The shelf number, for example, may be a number that is randomly applied by the address setting unit 31b, or may be a number that is input by the user with the keyboard 311 or the like.

The address setting unit 31b, for example, sets the shelf number in the storage unit 34 by associating the shelf number with the image of the article 1 that is set by the image setting unit 31a. Accordingly, the image of the article 1 and the address corresponding to the article 1 can be provided to the user by being displayed on one screen.

The article code setting unit 31*c* is a function of setting an article code for uniquely identifying the article 1 that is stored in the storage body 2. The article code, for example, may be data that is provided from the manufacturer of the article, or may be data that is input by the user with the keyboard 311 or the like.

The article code setting unit 31*c*, for example, sets the article code in the storage unit 34 by associating the article code with the image of the article 1 that is set by the image setting unit 31*a*, the address that is set by the address setting unit 31*b*, and the like. Accordingly, the image of the article 1, the address corresponding to the article 1, and the article code can be provided to the user by being displayed on one screen.

The article name setting unit 31*d* is a function of setting the name of the article 1 that is stored in the storage body 2 (an article name). The article name, for example, may be data that is provided from the manufacturer of the article 1, or may be data that is input by the user with the keyboard 311 or the like.

The article name setting unit 31*d*, for example, sets the article name in the storage unit 34 by associating the article name with the image of the article 1 that is set by the image setting unit 31*a*, the address that is set by the address setting unit 31*b*, the article code that is set by the article code setting unit 31*c*, and the like. Accordingly, the image of the article 1, the address corresponding to the article 1, the article code, and the article name can be provided to the user by being displayed on one screen.

The number of inventories setting unit 31*e* is a function of setting the inventory quantity of the article 1 that is stored in the storage body 2. For example, in a case where 100 washers are stocked on Aug. 1, 2019, the inventory quantity of the washer is set to "100". After that, in a case where 40 washers are released on Sep. 20, 2019, the inventory quantity of the washer is set to "60". The number of inventories setting unit 31*e*, for example, sets the inventory quantity in the storage unit 34 by associating the inventory quantity with the image of the article 1 that is set by the image setting unit 31*a*, the address that is set by the address setting unit 31*b*, the article code that is set by the article code setting unit 31*c*, the article name that is set by the article name setting unit 31*d*, and the like. Accordingly, the image of the article 1, the address corresponding to the article 1, the article code, the article name, and the inventory quantity can be provided to the user by being displayed on one screen.

The inbound date setting unit 31*f* sets the next scheduled inbound date of the article 1. The inbound date setting unit 31*f*, for example, sets the next scheduled inbound date in the storage unit 34 by associating the next scheduled inbound date with the image of the article 1 that is set by the image setting unit 31*a*, the address that is set by the address setting unit 31*b*, the article code that is set by the article code setting unit 31*c*, the article name that is set by the article name setting unit 31*d*, the inventory quantity that is set by the number of inventories setting unit 31*e*, and the like. Accordingly, the image of the article 1, the address corresponding to the article 1, the article code, the article name, the inventory quantity, and the next scheduled inbound date can be provided to the user by being displayed on one screen.

The outbound date setting unit 31*g* sets the next scheduled outbound date of the article. The outbound date setting unit 31*g*, for example, sets the next scheduled outbound date in the storage unit 34 by associating the next scheduled outbound date with the image of the article 1 that is set by the image setting unit 31*a*, the address that is set by the address setting unit 31*b*, the article code that is set by the article code setting unit 31*c*, the article name that is set by the article name setting unit 31*d*, the inventory quantity that is set by the number of inventories setting unit 31*e*, the next inbound date that is set by the inbound date setting unit 31*f*, and the like. Accordingly, the image of the article 1, the address corresponding to the article 1, the article code, the article name, the inventory quantity, the next scheduled inbound date, and the next scheduled outbound date can be provided to the user by being displayed on one screen.

The display management unit 33 includes an article display unit 33*a*, a selection part display unit 33*b*, an article image display unit 33*c*, an article specification display unit 33*d*, and a quantity setting screen display unit 33*e*.

The article display unit 33*a* has a function of displaying the article information that is set by the information setting unit 31 on a display 110 of the RFID reader 10. The article information is the information relevant to the article, and for example, is information in which the names of the articles 1 stored in each of one or a plurality of storage bodies 2 are associated with the article codes. The article information may be article information that is information in which the types of articles 1 stored in the one or the plurality of storage bodies 2 are associated with the number of articles 1. The article display unit 33*a* generates article list information that is information for displaying a list of the article information on the display 110 of the RFID reader 10 and transmits the article list information to the display 110 of the RFID reader 10. A specific example of the article information will be described below.

The selection part display unit 33*b* has a function of highlighting the selected article 1. For example, when the article 1 that is an outbound target is selected from the article information displayed on the basis of the article list information by performing a touch manipulation with respect to the display 110 of the RFID reader 10, article selection information indicating that it is the selected article 1 is input to the selection part display unit 33*b*. The selection part display unit 33*b* to which the article selection information is input extracts the article name or the like corresponding to the selected article 1 and generates highlighting information to be highlighted. The generated highlighting information is transmitted to the display 110 of the RFID reader 10. A specific example of the highlighting will be described below.

The article image display unit 33*c* has a function of displaying the image of the selected article 1 on the display 110 of the RFID reader 10. For example, the article image display unit 33*c* to which the article selection information described above is input extracts the image data of the corresponding article 1 from the storage unit 34 by collating the article information set in advance with the article selection information and transmits the image data to the display 110 of the RFID reader 10. A specific example of the image will be described below.

The article specification display unit 33*d* has a function of displaying article specification information that is information indicating the specification of the selected article 1 on the display 110 of the RFID reader 10. For example, the article specification display unit 33*d* to which the article selection information described above is input extracts the article code, the article name, the number of inventories, the inbound date, the outbound date, and the like of the corresponding article 1 as the article specification information from the storage unit 34 by collating the article information set in advance with the article selection information. The article specification display unit 33*d* generates specification image data that is image data for displaying a list of the article specification information on the display 110 of the RFID reader 10 and transmits the specification image data to the display 110 of the RFID reader 10. A specific example of the article specification information will be described below.

The quantity setting screen display unit 33e has a function of displaying a quantity setting screen for setting the quantity of the selected article 1 on the display 110 of the RFID reader 10. For example, in a case where 40 washers are released from the inventory of 100 washers, the quantity setting screen display unit 33e to which the article selection information indicating that the washer is selected is input reads out image data indicating the quantity of the washer from the storage unit 34 and transmits the image data to the display 110 of the RFID reader 10. Further, for example, increase and decrease button image data for increasing and decreasing the quantity of the washer in increments of 1 and increase and decrease button image data for increasing and decreasing the quantity of the washer in increments of 10 are read out from the storage unit 34 and are transmitted to the display 110 of the RFID reader 10.

An article quantity image is displayed on the display 110 of the RFID reader 10, on the basis of the image data indicating the quantity of the washer. In addition, an increase and decrease button image is displayed on the display 110 of the RFID reader 10, on the basis of the increase and decrease button image data. In a case where the number of articles 1 is changed by pressing the increase and decrease button image, quantity change data indicating a quantity change is input to the quantity setting screen display unit 33e. The quantity setting screen display unit 33e to which the quantity change data is input updates the inventory quantity stored in the storage unit 34 to the changed number. A specific example of the quantity setting screen will be described below.

The data input-output unit 35 inputs the identification information that is read by the RFID reader 10, the information of the article 1 that is set by the keyboard 311, the data that is photographed by the camera 313, the article selection information, the quantity change data, and the like.

In addition, the data input-output unit 35 outputs the article list information that is generated by the article display unit 33a, the highlighting information that is generated by the selection part display unit 33b, the image data that is extracted by the article image display unit 33c, and the like to the RFID reader 10.

In addition, the data input-output unit 35 outputs the article specification information that is extracted by the article specification display unit 33d, the image data indicating the quantity of the washer from the quantity setting screen display unit 33e, the increase and decrease button image data, and the like to the RFID reader 10.

Next, the operation of the inventory management system 100 and a screen display example will be described with reference to FIG. 4 to FIG. 8.

Figure 4:
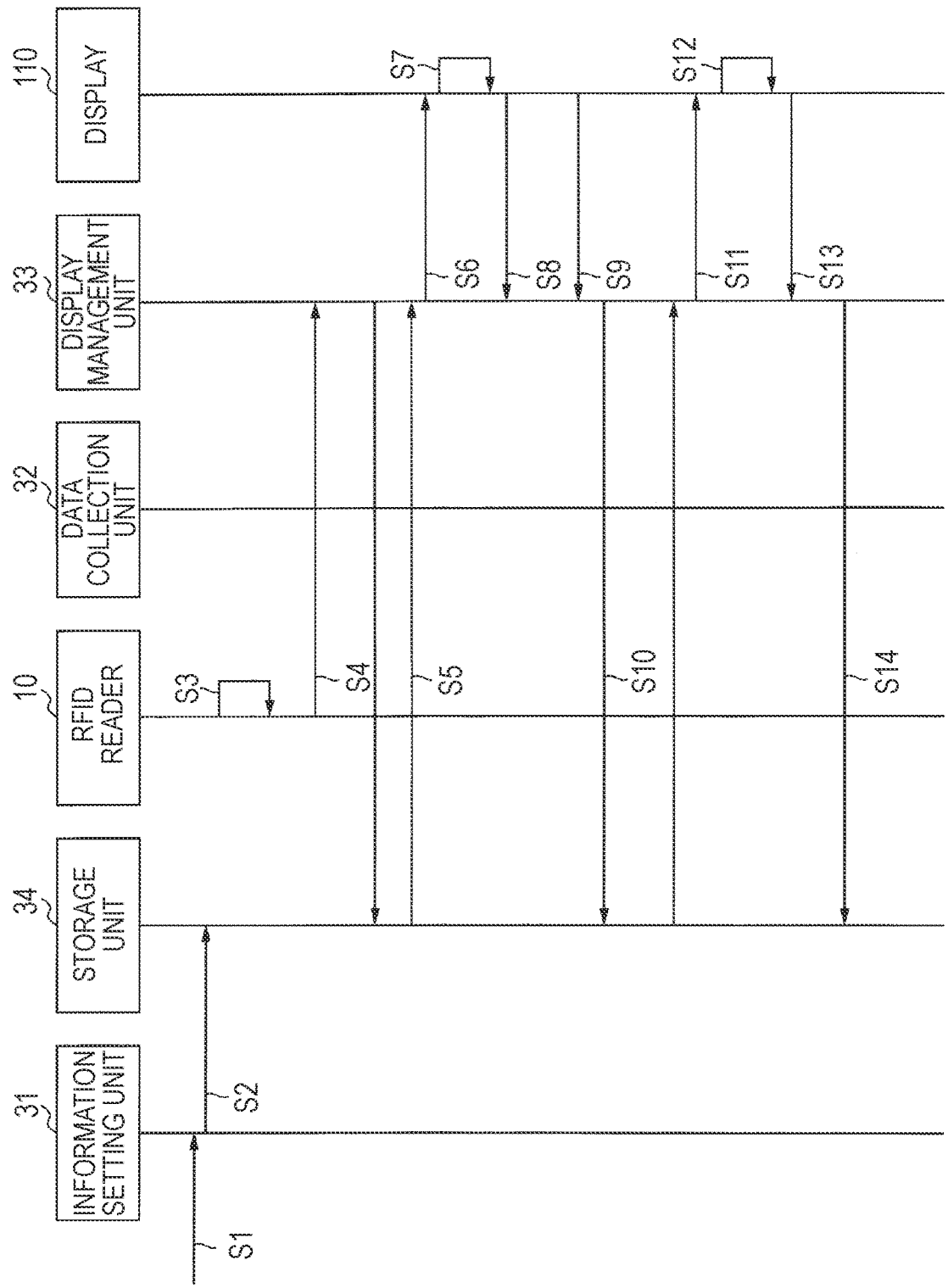
FIG. 4 is a sequence chart for describing an operation of the inventory management server.
Figure 5:
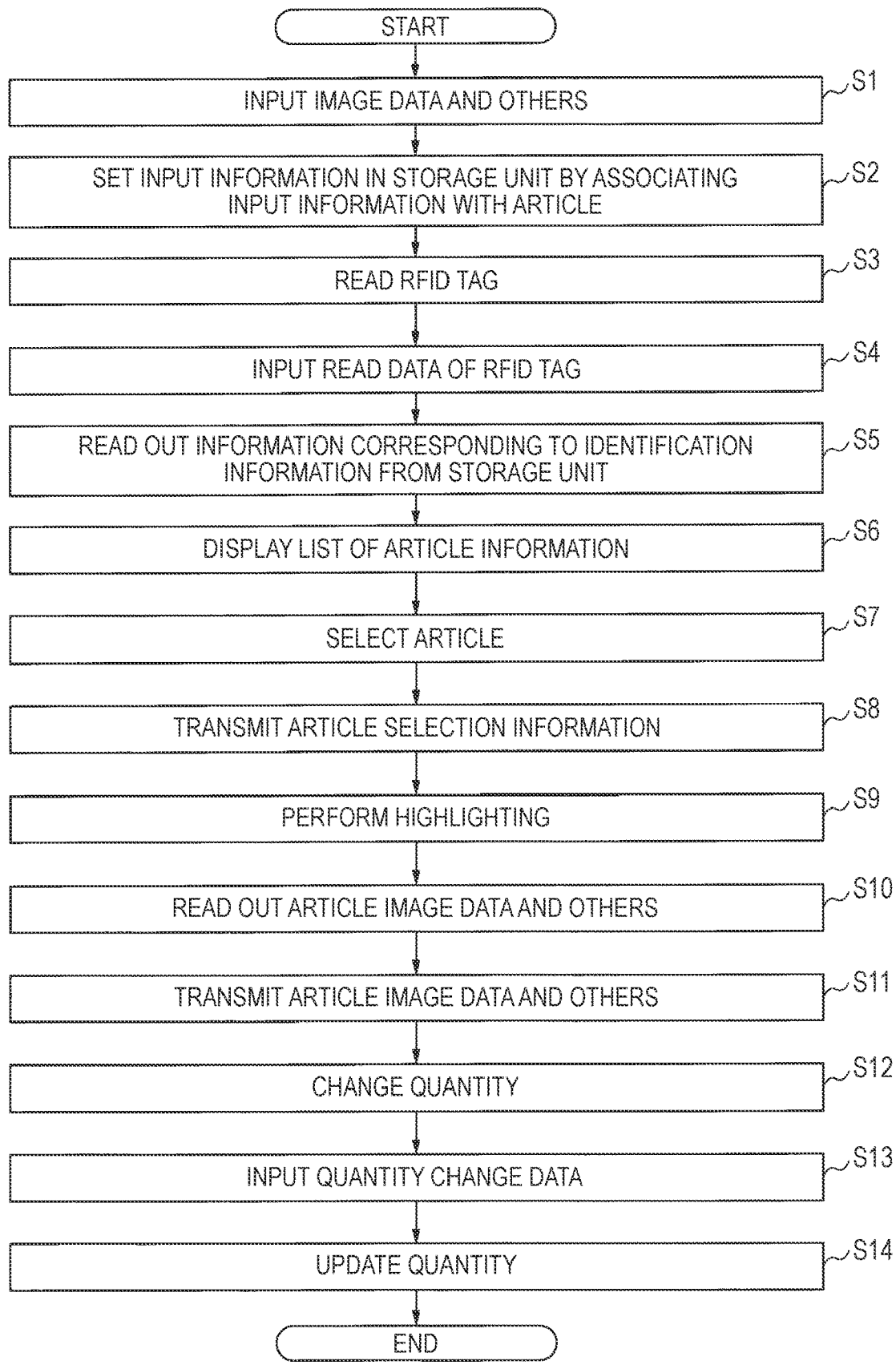
FIG. 5 is a flow chart for describing the operation of the inventory management server.
Figure 6:
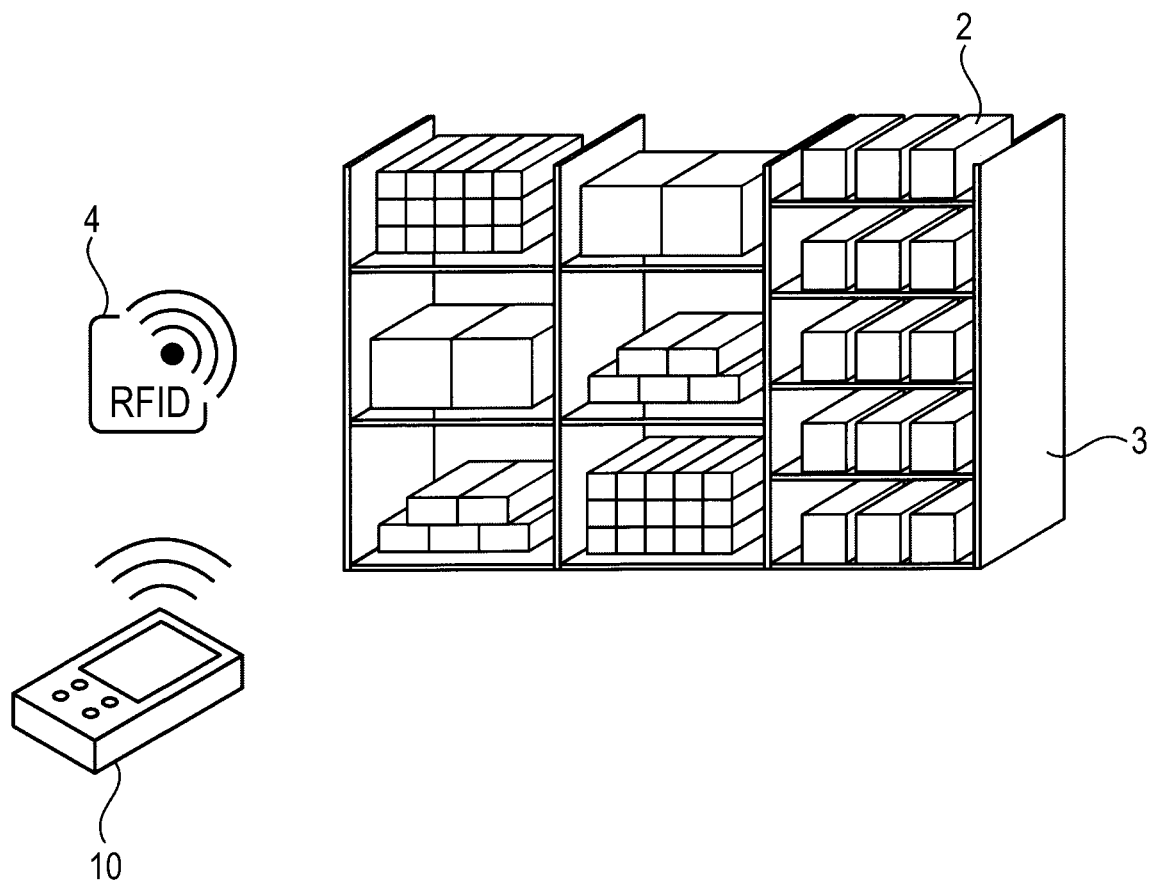
FIG. 6 is a diagram schematically illustrating a shelf on which a plurality of storage bodies are provided.

FIG. 4 is a sequence chart for describing the operation of the inventory management server. FIG. 5 is a flow chart for describing the operation of the inventory management server. FIG. 6 is a diagram schematically illustrating the shelf on which the plurality of storage bodies are provided.

Information such as the image data of the article 1 that is photographed by the camera 313, the address data that is set by the keyboard 311, the article code, the article name, the inventory quantity, the inbound date, and the outbound date is input to the information setting unit 31 (step S1), and the information setting unit 31 sets the input information in the storage unit 34 by associating the information with each of the plurality of articles 1 (step S2).

After that, in a case where the information of the RFID tag 4 of the storage body 2 stacked on the shelf 3 illustrated in FIG. 6 is read by the RFID reader 10 (step S3), the read data is transmitted to the display management unit 33 (step S4). Note that, the RFID tags 4 of the plurality of storage bodies 2 stacked on the shelf 3 are read by the RFID reader 10 with one manipulation. The display management unit 33 reads out the information corresponding to the identification information of the article 1 that is included in the data from the storage unit 34 (step S5). The information that is read out from the storage unit 34 is the name of the article 1 stored in each of the one or the plurality of storage bodies 2, the article code, and the like.

Figure 7:
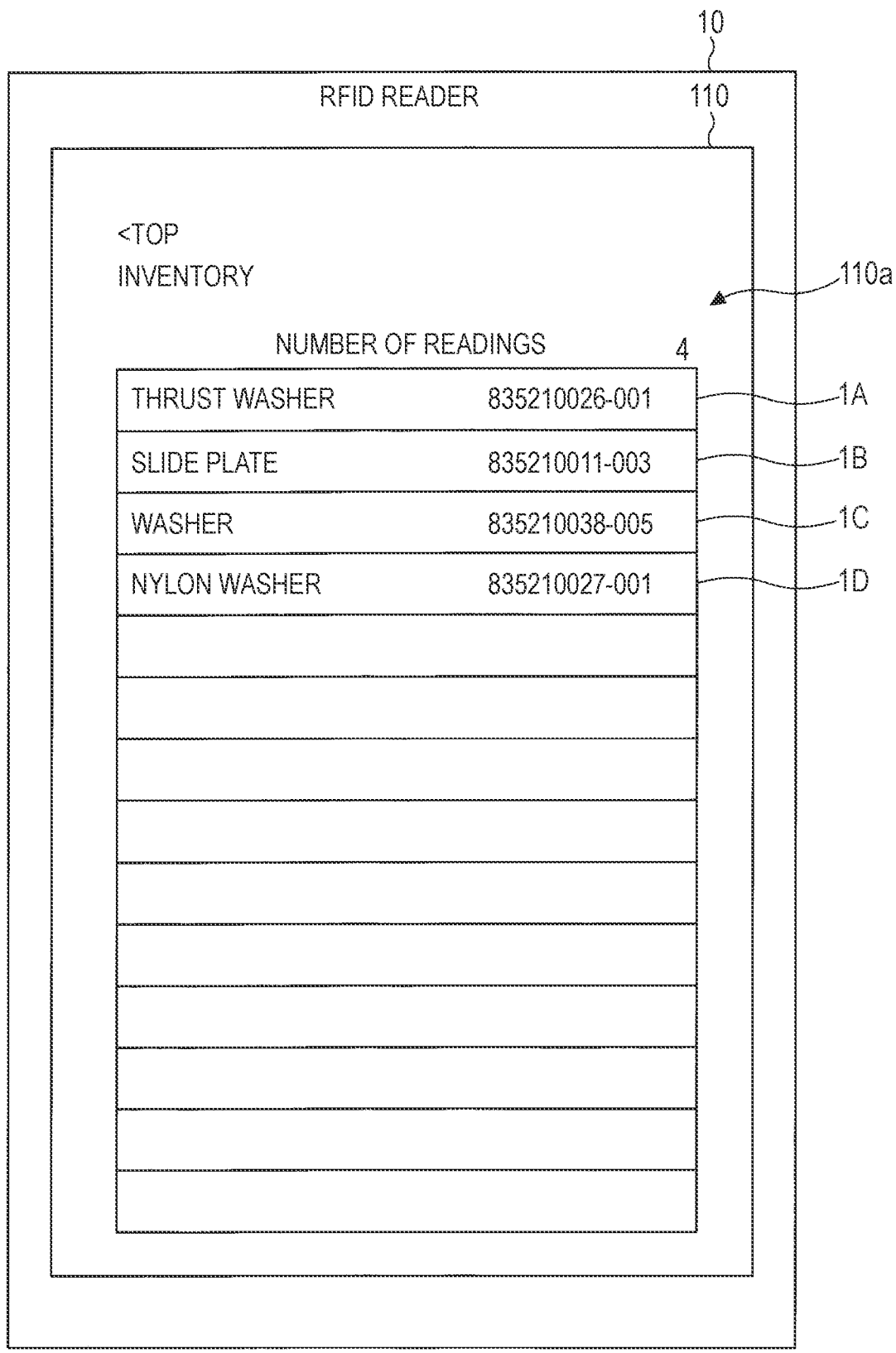
FIG. 7 is a diagram illustrating an example of a screen that is displayed by a display management unit.

As illustrated in FIG. 7, the display management unit 33 displays a list of the read article information on the display 110 of the RFID reader 10 (step S6). FIG. 7 is a diagram illustrating an example of a screen that is displayed by the display management unit. FIG. 7 illustrates an example of a first display screen 110a that is displayed as a list on the display 110 of the RFID reader 10.

In the first display screen 110a, for example, four article information items are included. In first article information 1A, for example, an article name "THRUST WASHER" and an article code "835210026" of "THRUST WASHER" are included. In second article information 1B, for example, an article name "SLIDE PLATE" and an article code "835210011" of "SLIDE PLATE" are included. In third article information 1C, for example, an article name "WASHER" and an article code "835210038" of "WASHER" are included. In fourth article information 1D, for example, an article name "NYLON WASHER" and an article code "835210027" of "NYLON WASHER" are included.

Note that, for example, serial codes "001", "003", and "005" for identifying whether the article 1 is in an unopened state, in an opened state, or in a state where a certain period elapses after the article 1 is stocked, and the like may be applied to the four article information items.

When the article 1 that is the outbound target is selected from the displayed article information (step S7), the article selection information is transmitted to the display management unit 33 from the display 110 of the RFID reader 10 (step S8).

Figure 8:
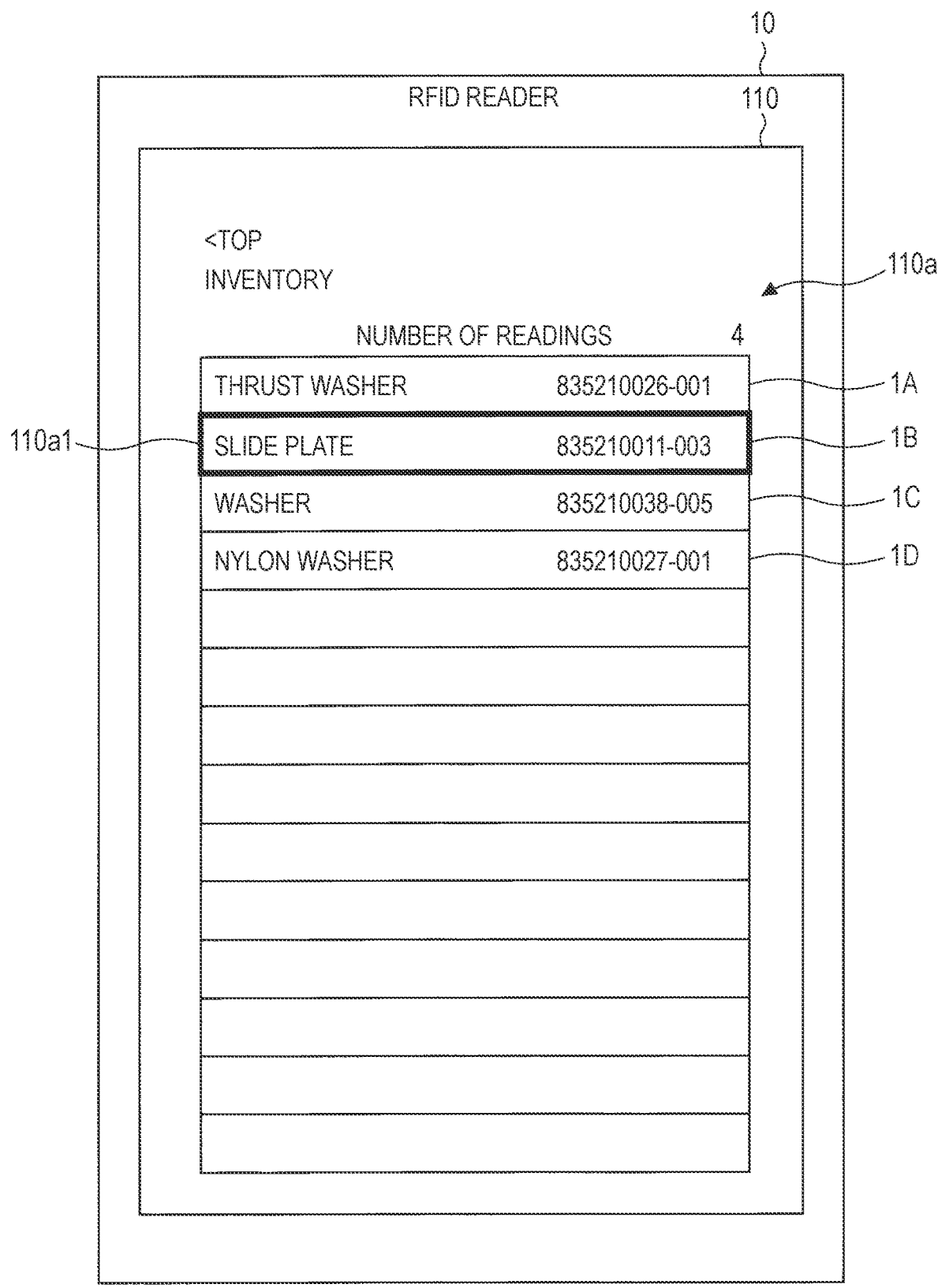
FIG. 8 is a diagram illustrating an example of highlighting.

The display management unit 33 performs highlighting as illustrated in FIG. 8, on the basis of the article selection information (step S9). FIG. 8 is a diagram illustrating an example of the highlighting. FIG. 8 illustrates a highlighting unit 110a1 when "SLIDE PLATE" is selected. For example, the article name "SLIDE PLATE", the article code of "SLIDE PLATE", and the serial code of "Slide Plate" are surrounded by a thick frame.

In addition, the display management unit 33 to which the article selection information is input reads the image data of the article 1, the article specification information, and the button image data from the storage unit 34 (step S10). The display management unit 33 transmits the image data of the article 1, the specification image data based on the article specification information, and the button image data to the display 110 of the RFID reader 10 (step S11). As a result thereof, a second display screen 110b as illustrated in FIG. 9 is displayed on the display 110.

Figure 9:
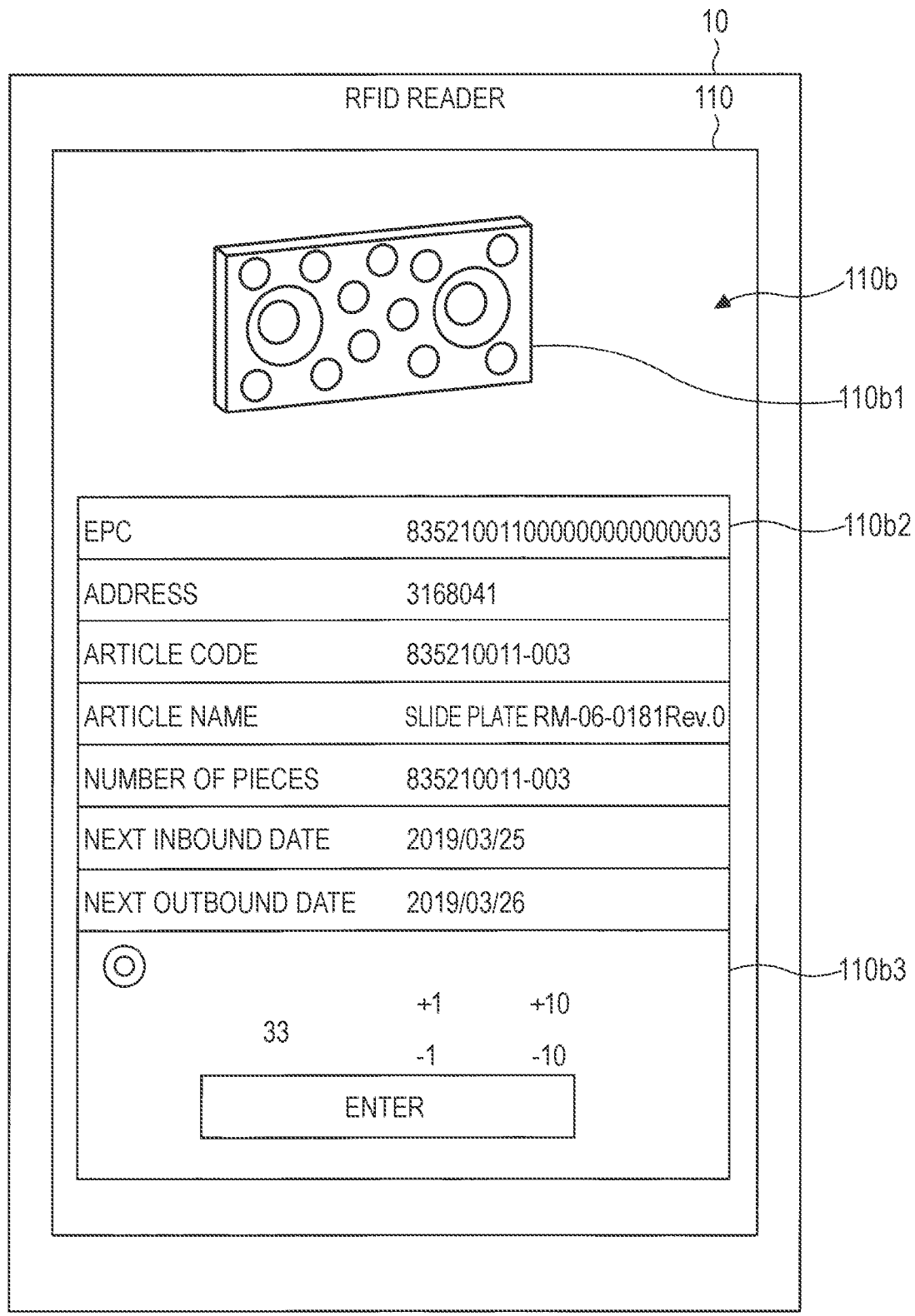
FIG. 9 is a diagram illustrating an example of an image to be displayed on a second display screen.

FIG. 9 is a diagram illustrating an example of an image to be displayed on the second display screen. In the second display screen 110b, for example, three types of images (a first image 110b1 to a third image 110b3) are included. The first image 110b1 is an appearance image of the article 1 that is based on the image data of the article 1. The second image 110*b*2 is an image representing the specification of the article 1 that is based on the article specification information. In the third image 110*b*3, the article quantity image representing the number of inventories of the article that is based on the image data indicating the quantity of the article 1 and the increase and decrease button image that is based on the increase and decrease button image data are included. In FIG. 9, the increase and decrease button image, for example, includes an image of a button for increasing and decreasing the article 1 in increments of 1 and an image of a button for increasing and decreasing the article 1 in increments of 10.

When the increase and decrease button of the third image 110*b*3 is pressed, and thus, the number of articles 1 represented in the first image 110*b*1 is changed (step S12), the article quantity image is changed corresponding to the changed number, and the quantity change data is input to the display management unit 33 (step S13). The display management unit 33 to which the quantity change data is input updates the inventory quantity that is stored in the storage unit 34 to the changed number (step S14). Accordingly, next, when the article is released, the article quantity image becomes an image of the latest quantity on the display 110 of the RFID reader 10.

Note that, the article specification information that is displayed as the second image 110*b*2, for example, may be any one of the address, the article code, the article name, the number of articles, the next inbound date, and the next outbound date.

In addition, only the third image 110*b*3 may be displayed on the second display screen 110*b*. According to such display, a screen for manipulating the inventory quantity of the article 1 can be displayed in a large size, and thus, the user is capable of performing the inventory management while accurately grasping the inventory quantity of the article 1. In addition, the inventory quantity can be easily adjusted by displaying the third image 110*b*3, without using an input unit such as the keyboard 311.

In addition, only the first image 110*b*1 and the third image 110*b*3 may be displayed on the second display screen 110*b*. According to such display, the user is capable of adjusting the inventory quantity of the article 1 after grasping that the image of the selected article 1 is the article 1 that is the outbound target, and thus, more accurate inventory management can be attained.

In addition, only the second display screen 110*b* and the third image 110*b*3 may be displayed on the second display screen 110*b*. According to such display, the user is capable of adjusting the inventory quantity of the article 1 after grasping the specification information of the selected article 1, and thus, more accurate inventory management can be attained.

In addition, the first display screen 110*a* and the second display screen 110*b* may be displayed on a terminal device other than the RFID reader 10, for example, a display such as a tablet terminal and a smart phone. The inventory management can be performed by using the tablet terminal or the like, without being restricted by the size of the display 110 of the RFID reader 10.

The first display screen 110*a* and the second display screen 110*b* are displayed on the display 110 of the RFID reader 10, and thus, the quantity of the article 1 corresponding to the identification information can be adjusted by the RFID reader 10 while reading the identification information of the RFID tag 4. Accordingly, the introduction cost for constructing the inventory management system 100 can be greatly reduced, compared to the case of using the tablet terminal or the like together.

Note that, the information setting unit 31, the display management unit 33, and the storage unit 34 may be provided in the RFID reader 10, the tablet terminal, the smart phone, and the like, which are the terminal device.

Note that, the terminal device according to this embodiment may be configured such that the number of articles 1 corresponding to each of a plurality of types of articles 1 is written in the RFID tag 4 provided in the storage body 2, and is managed by the memory of the terminal device, or is managed by the memory of the server connected to the terminal device through the network. The number of articles 1 is managed by the memory of the terminal device, and thus, the inventory management can be performed without using the server or the like, and the configuration of the system can be simplified. In addition, the number of articles 1 is managed by the memory of the server, and thus, the inventory management can be performed remotely from the terminal device, and the inventory management can be flexibly performed.

In addition, the article display unit 33*a* of the display management unit 33 may be configured such that for the article 1 having a quantity of a predetermined number or less in the plurality of types of articles 1, warning information for warning that the quantity is the predetermined number or less is displayed on the display 110, or is issued to the outside of the terminal device through the network connected to the terminal device. For example, the display management unit 33 compares the number of nylon washers that is set by the quantity setting screen display unit 33*e* with a predetermined number (for example, "10") of nylon washers that is set in advance in the storage unit 34, reads out the warning information that is set in advance in the storage unit 34 when the number of nylon washers is the predetermined number "10" or less, and transmits the warning information to the external terminal device or the like. According to such a configuration, the user who has received the warning information is capable of taking measures such as additionally ordering the article 1 before being out of the number of inventories of the article 1.

In addition, the terminal device according to this embodiment may be configured such that for the article 1 having the quantity of the predetermined number or less in the plurality of types of articles 1, an order is automatically placed in order to replenish the article 1 when the quantity is the predetermined number or less. For example, the display management unit 33 compares the number of nylon washers that is set by the quantity setting screen display unit 33*e* with a predetermined number (for example, "10") of nylon washers that is set in advance in the storage unit 34, reads out additional order information that is set in advance in the storage unit 34 when the number of nylon washers is the predetermined number "10" or less, and transmits the additional order information to the external terminal device or the like. According to such a configuration, the user is capable of reducing a labor hour for performing an ordering procedure before being out of the number of inventories.

In addition, the terminal device according to this embodiment may be configured such that information indicating the location of the article 1 is displayed on the display. In a case where the shelf 3 is provided in the specific compartment in the warehouse, the information indicating the location of the article 1 is the compartment number indicating the compartment, the in-compartment shelf position number indicating each of the positions of the plurality of shelves 3 arranged in the compartment, the article position number indicating the arrangement position of the storage body 2 in each of the shelves 3 (for example, the upper stand, the middle stand, the lower stand, and the like), and the like. Accordingly, even in a case where the plurality of storage bodies 2 are read, the storage bodies 2 can be easily specified.

In addition, the terminal device according to this embodiment may be configured such that an image of an arrangement position of the article 1 on the shelf 3 on which the article 1 is provided is registered. According to such a configuration, even in a case where the plurality of storage bodies 2 are read, the articles included in the storage bodies 2 can be easily specified.

In addition, the terminal device according to this embodiment may be configured to include an image changing unit changing the image of the article 1 to be displayed on the display. Accordingly, the image that is once registered can be changed to the latest image, and the article 1 that is actually the inventory management target can be easily checked.

The configurations described in the above embodiment represent an example of the contents of the disclosure, and can also be combined with another known technology, or a part of the configurations can also be omitted or changed within a range not departing from the gist of the disclosure.

This international application claims priority based on Japanese Patent Application No. 2019-180777 filed on Sep. 30, 2019, and the entire contents of No. 2019-180777 are incorporated herein by reference.

REFERENCE SIGNS LIST

1 Article
2 Storage body
4 RFID tag
10 RFID reader
30 Inventory management server
31 Information setting unit
31a Image setting unit
31b Address setting unit
31c Article code setting unit
31d Article name setting unit
31e Number of inventories setting unit
33 Display management unit
33a Article display unit
33b Selection part display unit
33c Article image display unit
33d Article specification display unit
33e Quantity setting screen display unit
100 Inventory management system
110 Display
110a First display screen
110a1 Highlighting unit
110b Second display screen

The invention claimed is:

1. A terminal device, comprising:
an RFID reader that reads identification information of articles stored in one or a plurality of storage bodies, the identification information being read out from RFID tags provided in the one or the plurality of storage bodies storing the articles, wherein each RFID tag is associated with a storage body storing the articles corresponding to the RFID tag, and wherein the number of articles corresponding to each type of article of a plurality of types of articles is written in the RFID tag associated with the storage body;
an article display unit displaying, on a display provided in the RFID reader, a list of article information that is information in which types of articles stored in the one or the plurality of storage bodies are associated with the number of articles, on the basis of the identification information read out by the RFID reader, wherein, for each storage body, the RFID reader is adapted to read the identification information from the RFID tag associated with the storage body storing the articles corresponding to the RFID tag;
a quantity setting screen display unit displaying, on the display, a screen for setting, by an inventory-quantity-adjusting input operation of a user of the RFID reader, an inventory quantity of an article selected from a list of the articles displayed on the display; and
a display management unit updating the inventory quantity of the selected article in response to the inventory-quantity-adjusting input operation of the user.

2. The terminal device according to claim 1, wherein the quantity setting screen display unit displays a button for increasing and decreasing the inventory quantity on the display.

3. The terminal device according to claim 1, further comprising:
an article image display unit displaying an image of the selected article on the display.

4. The terminal device according to claim 1, further comprising:
an article specification display unit displaying article specification information that is information indicating a specification of the selected article on the display.

5. The terminal device according to claim 1, wherein the number of articles corresponding to each type of article of the plurality of types of articles is managed by a memory of the terminal device, or is managed by a memory of a server connected to the terminal device through a network.

6. The terminal device according to claim 1, wherein for an article having a quantity of a predetermined number or less in the plurality of types of articles, the article display unit displays warning information for warning that the quantity is the predetermined number or less on the display, or issues the warning information to the outside of the terminal device through the network connected to the terminal device.

7. The terminal device according to claim 1, wherein for the article having the quantity of the predetermined number or less in the plurality of types of articles, an order is automatically placed in order to replenish the article when the quantity is the predetermined number or less.

8. The terminal device according to claim 1, wherein information indicating a location of the article is displayed on the display.

9. The terminal device according to claim 1, wherein an image of an arrangement position of the article on a shelf on which the article is provided is registered.

10. The terminal device according to claim 1, further comprising:
an image changing unit changing an image of the article to be displayed on the display.

11. An inventory management system provided with a terminal device and a server connected to the terminal device, the system comprising:
an RFID reader that reads identification information of articles stored in one or a plurality of storage bodies, the identification information being read out from RFID tags provided in the one or the plurality of storage bodies storing the articles, wherein each RFID tag is associated with a storage body storing the articles corresponding to the RFID tag, and wherein the number of articles corresponding to each type of article of a plurality of types of articles is written in the RFID tag associated with the storage body;

an article display unit displaying, on a display provided in the RFID reader, a list of article information that is information in which types of articles stored in the one or the plurality of storage bodies are associated with the number of articles, on the basis of the identification information read out by the RFID reader, wherein, for each storage body, the RFID reader is adapted to read the identification information from the RFID tag associated with the storage body storing the articles corresponding to the RFID tag;

a quantity setting screen display unit displaying, on the display, a screen for setting, by an inventory-quantity-adjusting input operation of a user of the RFID reader, an inventory quantity of an article selected from a list of the articles displayed on the display; and a display management unit updating the inventory quantity of the selected article in response to the inventory-quantity-adjusting input operation of the user.

* * * * *